June 7, 1966

G. I. ROBERTS 3,254,394

METHOD AND APPARATUS FOR THE INSERTION OF INSULATION TAPE
IN SLOTS OF A STATOR OR ROTOR UNIT FOR USE
IN AN ELECTRICAL DEVICE

Filed March 13, 1962

INVENTOR.
GEORGE I. ROBERTS
BY *Herbert L. Davis*

ATTORNEY

INVENTOR.
GEORGE I. ROBERTS
BY Herbert L. Davis
ATTORNEY

June 7, 1966  G. I. ROBERTS  3,254,394
METHOD AND APPARATUS FOR THE INSERTION OF INSULATION TAPE
IN SLOTS OF A STATOR OR ROTOR UNIT FOR USE
IN AN ELECTRICAL DEVICE
Filed March 13, 1962  5 Sheets-Sheet 5

FIG. 8

INVENTOR.
GEORGE I. ROBERTS
BY
ATTORNEY

United States Patent Office 3,254,394
Patented June 7, 1966

3,254,394
METHOD AND APPARATUS FOR THE INSERTION OF INSULATION TAPE IN SLOTS OF A STATOR OR ROTOR UNIT FOR USE IN AN ELECTRICAL DEVICE
George I. Roberts, Maywood, N.J., assignor to The Bendix Corporation, Teterboro, N.J., a corporation of Delaware
Filed Mar. 13, 1962, Ser. No. 179,336
16 Claims. (Cl. 29—155.5)

This invention relates to a novel method and apparatus for the insertion of insulation tape in slots of a stator or rotor unit for use in an electrical device. More particularly, the invention relates to a novel method and means for electrically insulating the slots of stator or rotor units for motors, generators, synchros or the like so as to prepare the units for the winding of field coils in the slots of such units by apparatus and methods disclosed and claimed in copending U.S. application Serial No. 746,437, filed July 3, 1958, issued as U.S. Patent No. 3,061,211, by George I. Roberts, and in U.S. application Serial No. 37,142, filed June 20, 1960, issued as U.S. Patent No. 3,061,212, by George I. Roberts, both of which applications have been assigned to The Bendix Corporation, assignee of the present application.

Heretofore individual slots of such stator or rotor units have been insulated by the hand insertion of individual strips of insulation tape in each slot. In the insertion of individual strips of insulation tape in the several slots of the unit, it has been found that considerable time is taken inasmuch as the individual strips of insulation tape move around, and the operator has to spend considerable time in keeping the individual strips of tape in correct position in the several slots of the unit. In distinction, a continuous strip of insulation tape has been found to remain relatively secure in the several slots of the unit so that the insertion of coils of wire in the several slots of the unit may be effected without an unnecessary loss of time on the part of the operator in repositioning the inserted insulation tape.

An object of the invention therefore is to provide a novel method and apparatus for inserting an insulation tape in the form of a continuous strip into the slots of a stator or rotor unit to electrically insulate the unit for use in electrical apparatus.

Another object of the invention is to provide a novel method and means for inserting a thin electrical insulation tape in the slots of a unit in which coils are to be wound, and in which the insulation tape is inserted in the slots as a continuous tape so formed in the slots of the unit as to completely insulate the unit from the coil windings to be thereafter wound in the slots.

Another object of the invention is to provide novel means for inserting a strip of insulation tape in the slots of a device and forming the strip of tape to the contour of the slots.

Another object of the invention is to provide novel pin means for forming the strip of tape to the precise contour of the slots of the device.

Another object of the invention is to provide a novel forming blade and means to selectively move the forming blade laterally into each of the several slots of a device so as to force, push, or press the strip of tape into each of the slots together with novel means for rotating the forming blade therein so as to preform a small loop in the tape in each of the slots and further provide novel pin means insertable into the several tape loops as formed in the slots of the device so as to hold the strip of tape to the contour of the slots while the tape is subjected to heat at a sufficiently high temperature as to cause the strip of insulation tape to be set to the contour of the slots of the device.

Another object of the invention is to provide novel automatically operable means for inserting a strip of electrical insulation tape into several slots of a device, together with means for forming the strip of insulation tape to the configuration of the several slots.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
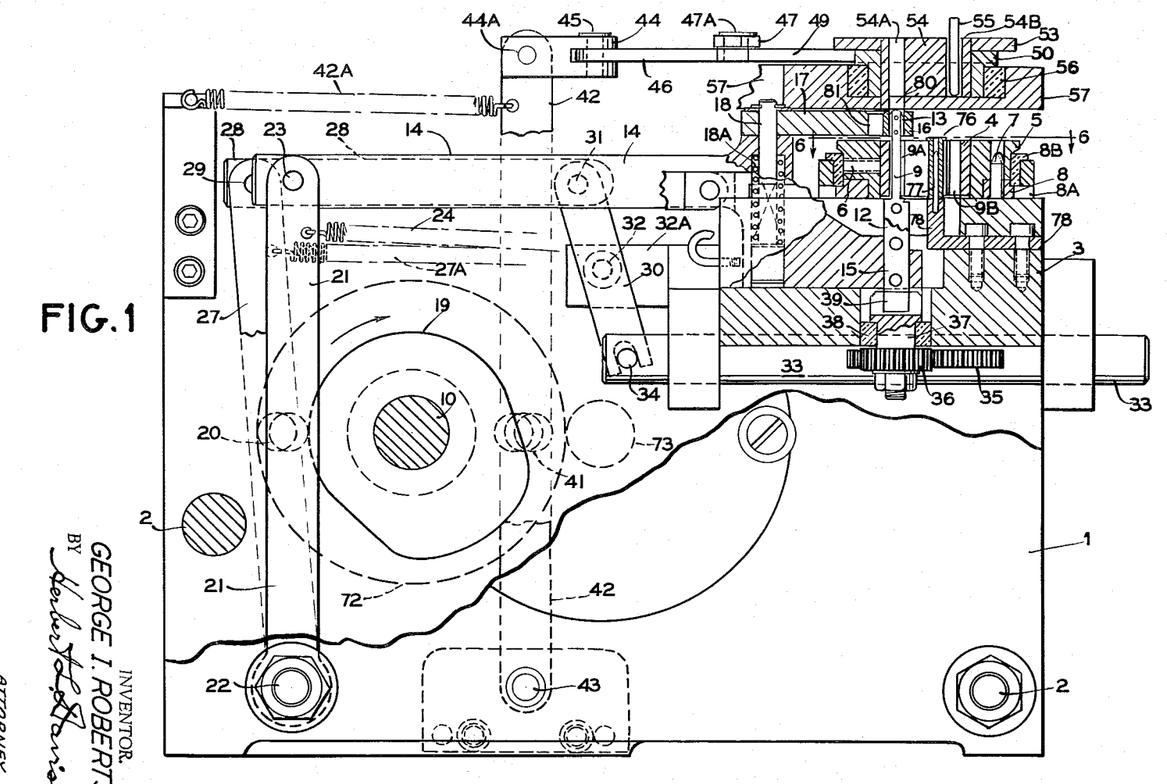
FIGURE 1 is an end view of the insulation tape insertion apparatus with the unit to be processed shown in section and certain parts of the tape insertion apparatus broken away or shown in phantom so as to more clearly illustrate certain of the cooperating mechanism therein.
Figure 2:
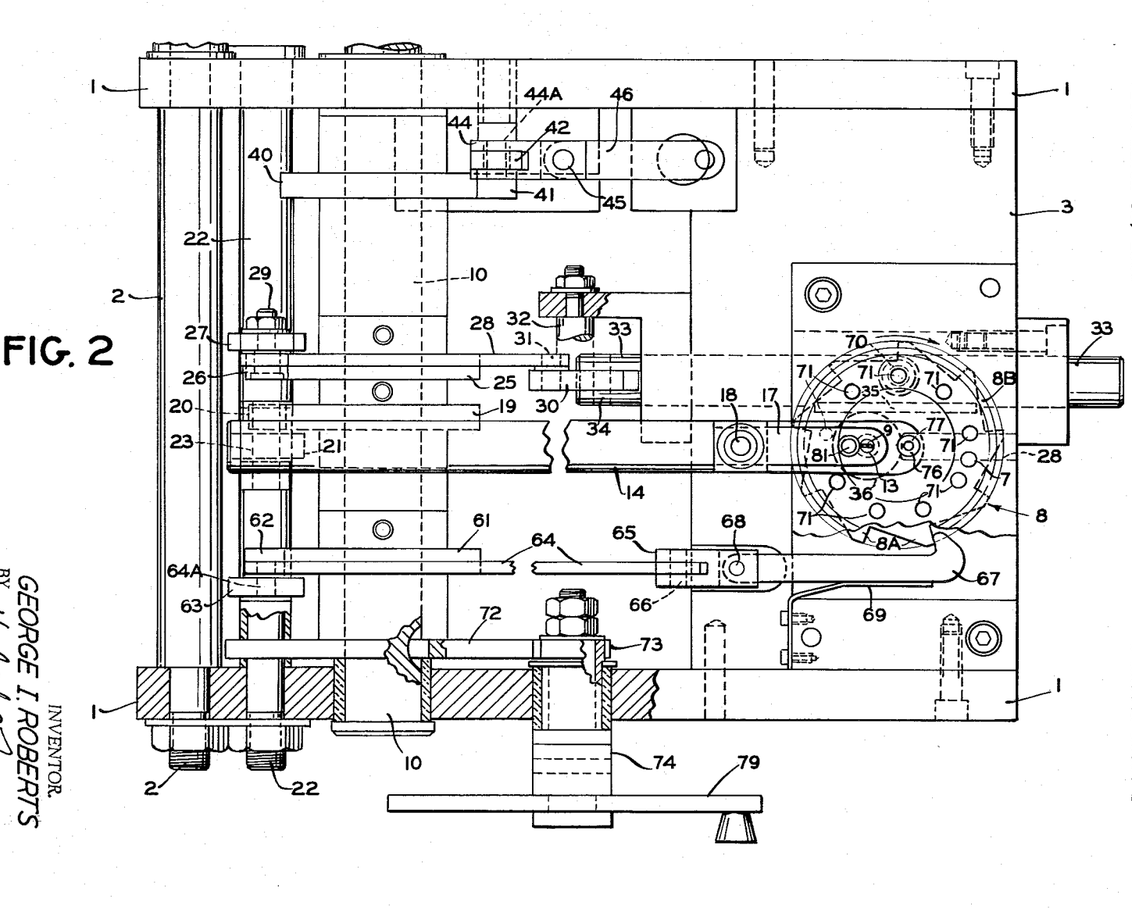
FIGURE 2 is top plan view of FIGURE 1 with the unit to be processed removed and certain parts of the tape insertion apparatus including an operator-operative movable top plate broken away so as to better illustrate certain of the cooperating mechanism therein.

Referring to the drawing of FIGURE 1, the supporting structure of the tape insertion apparatus includes two outer plates indicated by the numeral 1 and assembled together by bolts 2 and a bridge member 3, as shown in FIGURES 1 and 2. The operating mechanism further includes means for inserting a thin electrical insulation tape of a type such as "Mylar" tape having a thickness for example of only .001"–.002" into slots of a stator or rotor unit 4 of a device in which coils of wire are to be later wound.

The mechanism further includes means for rotating the insertion means so as to preform a loop of the insulation tape within each of the slots of the unit 4 together with other means comprising a number of pins for forming each of the preformed loops of the insulation tape into the precise configuration of each of the slots of the unit 4, together with means for inserting the pins into the several slots and preformed loops of the tape in the unit 4.

*Lateral movement of the forming blade*

Figures 5, 6, 7:
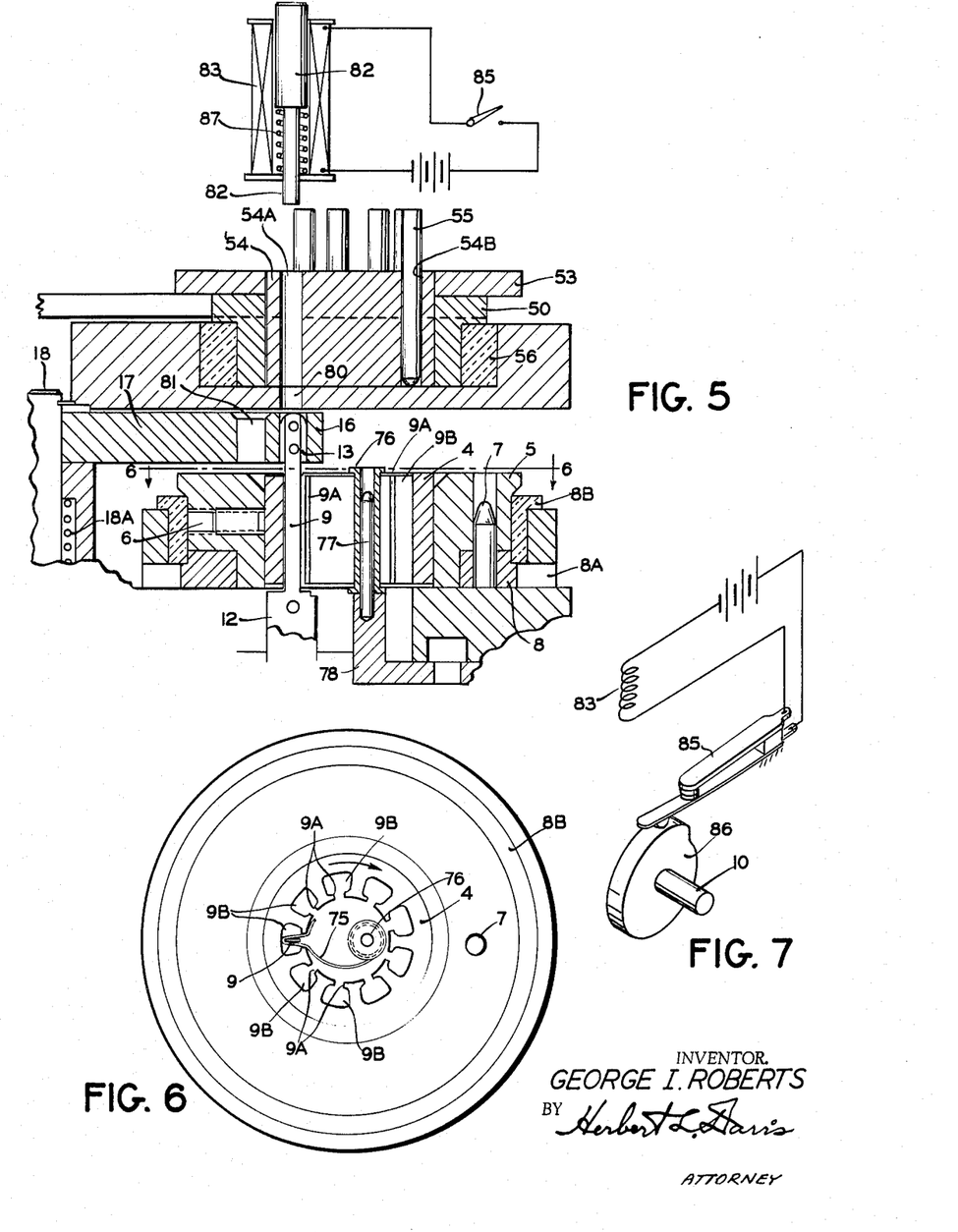
FIGURE 5 is a fragmentary sectional view of a modified form of the pin inserting apparatus of FIGURE 1.
FIGURE 6 is a fragmentary top plan view of the nest assembly taken along the lines 6—6 of FIGURE 1 and looking in the direction of the arrows.
FIGURE 7 is a fragmentary view of a modified form of the apparatus and showing a cam positioned by the cam shaft of FIGURE 1 to automatically control the pin inserting apparatus of FIGURE 5.

It may be noted that prior to the operation of the tape insertion mechanism, the slotted unit which is to be insulated and shown in FIGURES 1 and 6, is first indexed radially in a nest 5 and held in the indexed position by a set screw 6 before assembly of the nest 5 in the mechanism. The unit 4 may be a stator unit of a type having a bore and radial slots opening therefrom.

The nest 5 with the slotted unit 4 secured therein in the indexed position is then located in the mechanism by a positioning pin 7 which projects from a ratchet gear 8, shown in FIGURES 1 and 2. The ratchet gear 8 has an annular flange 8B mounted thereon for receiving the nest 5. The slotted unit 4 secured in the nest 5 is so indexed that a forming blade 9, as shown in FIGURE 1, is positioned in alignment with a thin slot opening 9A leading into a first slot 9B of the unit 4, as shown in FIGURE 6.

A cam shaft 10, shown in FIGURES 1 and 2, is journaled in suitable bearings provided in the two plates 1 and rotatable therein so as to provide means for driving the various functional parts of the tape insulation insertion apparatus in timed relation, as shown graphically by FIGURE 8 and hereinafter explained. The forming blade 9, shown in FIGURE 1, has a very thin cross sectional area in order that the same may move laterally through an extremely narrow slot opening 9A (.020" in the present application) into the slot 9B.

Further, the forming blade 9, as shown in FIGURE 1, is fastened to round end pieces 12 and 13 rotatably supported by a U-shaped forked member 14 so that the forming blade 9 may be rotated in the slot 9B, as well as moved in a lateral direction through the slot opening 9A in timed relation through the operation of suitable cam mechanisms, as hereinafter explained.

The round end pieces 12 and 13 of the forming blade 9 are rotatably mounted in bearings 15 and 16 carried by end portions of the U-shaped forked reciprocating member 14. The bearing 16 is formed as a part of a spring-loaded plate 17 removably attached to the lever 14 at point 18 and normally biased by a spring 18A to the position shown.

A cam 19 affixed to shaft 10 and shown in FIGURES 1 and 2, has a variable cam surface arranged in cooperative relation with a roller 20 mounted on a lever 21. The lever 21 is pivotally mounted at one end on a shaft 22, as shown in FIGURE 1. The shaft 22 serves as a pivot point for a number of levers operated from cams carried by the shaft 10, as explained hereinafter.

At the other end of the lever 21, the member 14 is operatively connected by means of a pin 23. The lever 21 and thereby the reciprocating member 14 is biased by a spring 24, as shown in FIGURE 1, so as to move the roller 20 into contacting relation with the cam surface of the cam 19. Thus, rotation of the cam 19 effects reciprocating movement of the member 14 and in accordance therewith a lateral movement is imparted to the forming blade 9 carried thereby in and out of the slot opening 9A of FIGURE 6, as heretofore described, in a timed relation as set by the variable cam surface of the cam 19.

Figure 8:
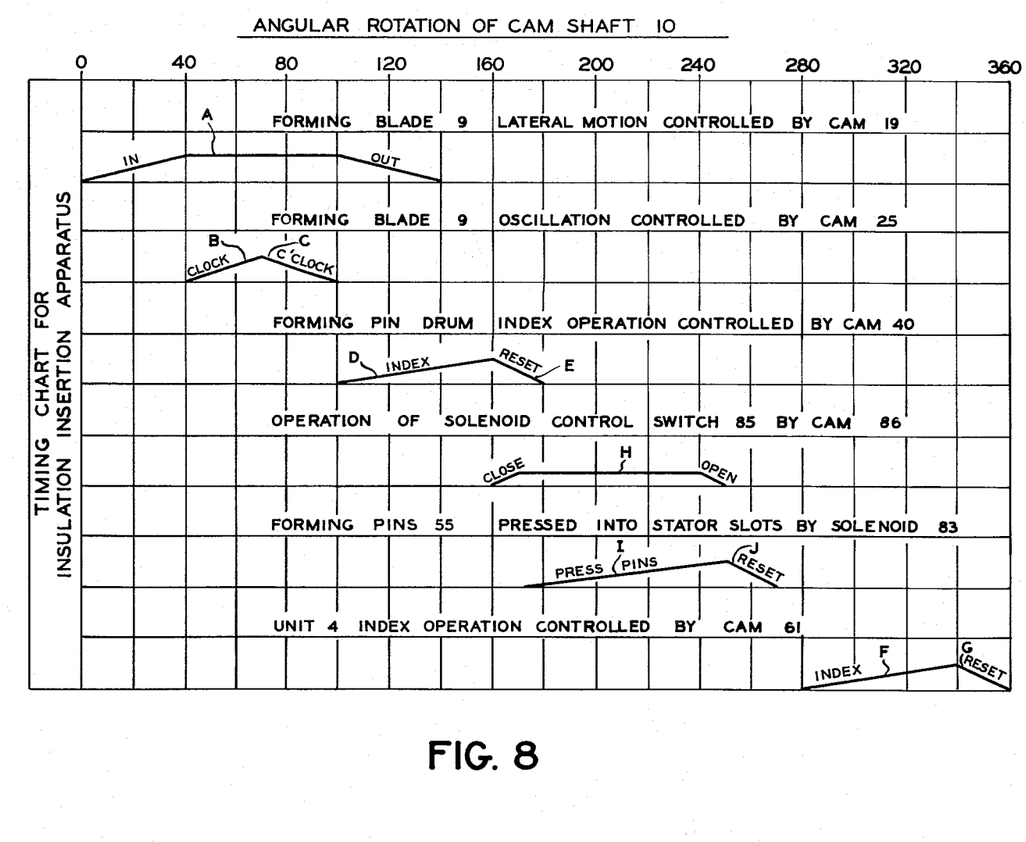
FIGURE 8 is a drawing of a timing chart showing graphically the timed relation between the several steps in the method and operation of the apparatus of the invention.

The foregoing operation of the cam 19 is shown graphically on FIGURE 8 by a line A and from which it will be seen that as the cam shaft 10 is rotated from a zero degree (0°) position to a forty degree (40°) position, the forming blade 9 is moved laterally through the slot opening 9A fully into the slot 9B of the unit 4. The forming blade 9 remains in the slot 9B as rotation of the cam shaft 10 continues from the forty degree (40°) position to the one hundred degree (100°) position. However, as the cam shaft 10 is rotated from the one hundred degree (100°) position to the one hundred and forty degree (140°) position, the blade 9 is moved laterally out of the slot 9B and through the slot opening 9A into the bore of the stator or rotor unit 4 in which the insulation tape is to be applied.

Further, as shown graphically on FIGURE 8, as the cam shaft 10 is rotated from the forty degree (40°) position, to the one hundred degree (100°) position, the forming blade 9 while in the slot 9B is effectively oscillated in a clockwise direction as the cam shaft 10 is rotated from the forty degree (40°) position to the seventy degree (70°) position, as shown graphically on FIGURE 8 by the line B, and thereafter, as the cam shaft 10 is rotated from the seventy degree (70°) position to the one hundred degree (100°) position, the forming blade 9 is oscillated in a counter clockwise direction, as shown graphically on FIGURE 8 by the line C.

Oscillation of the forming blade

In order to effect the foregoing oscillation of the blade 9, there is mounted on the shaft 10 a cam 25 having a variable cam surface and arranged in contacting relation therewith, a roller 26 carried by a lever 27 which is also pivotally mounted at one end on shaft 22, as shown in FIGURES 1 and 2. At the opposite end of the lever 27 there is operatively connected by a pin 29 one end of a link 28. The link 28 is in turn attached at its opposite end by a pin 31 to one end of a lever 30, as shown in FIGURES 1 and 2. The lever 30 is pivotally mounted at a point intermediate its opposite ends by a fixed pin 32 projecting from a mounting arm 32A. The lever 30 operatively engages at its other end a slidable member 33 at an actuating pin 34. Attached to the slidable member 33 is a gear rack 35, shown in FIGURES 1 and 2, operatively engaging a gear 36 which in turn is attached to a stud 37 rotatable in a bearing 38, as best shown in FIGURE 1.

A key portion 39 of the forming blade 9 slidably engages in a slot in the stud 37 so that the forming blade 9 is effectively rotated or oscillated whenever the stud 37 rotates while at the same time the forming blade 9 is free to move laterally in response to reciprocating movement of the U-shaped member 14, because of the slidable engagement of the key portion 39 in the slot of the stud 37. The lever 27 is biased by a spring 27A so as to maintain the roller 26 in contacting relation with the variable cam surface of the cam 25 whereupon rotation of the cam 25 moves the lever 27, linkage 28 and lever 30 to actuate the member 33 and thereby the gear rack 35 so as to rotate or oscillate the forming blade 9 through gear 36 and stud 37 operatively engaging the key portion 39 thereof, as shown in FIGURE 1.

It will be seen that, as shown graphically on FIGURE 8, the foregoing rotation or oscillation of the forming blade 9 will be effected in a clockwise direction, as shown by the line B, and then in a counter clockwise direction, as shown by the line C, while the forming blade 9 remains within the slot 9B, as indicated by the line A on the graph of FIGURE 8.

Forming pin operation

Figure 3:
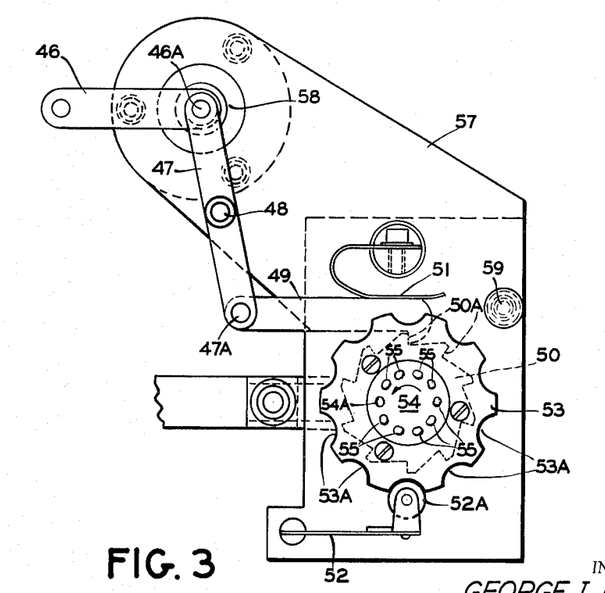
FIGURE 3 is a top plan view of the operator-operative top plate together with the actuating linkage and ratchet to operate the pin positioning means for forming the insulating tape to the contour of the slots of the stator or rotor unit.
Figure 4:
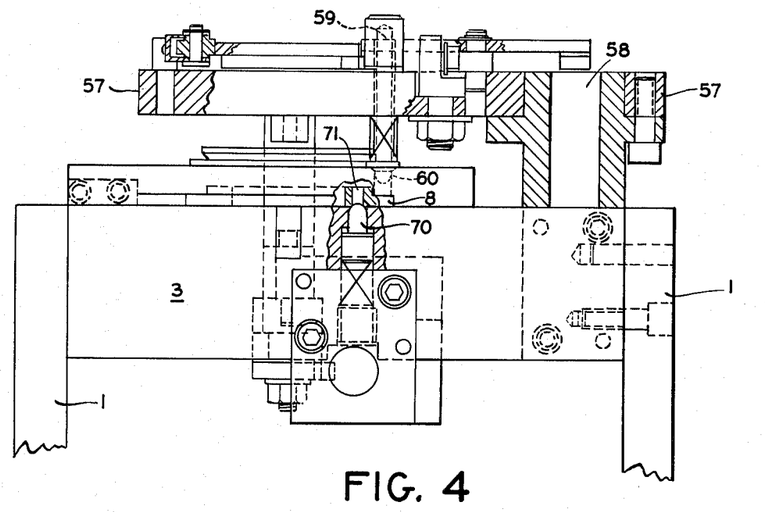
FIGURE 4 is an end view of the top plate of FIGURE 3 in assembled relation to the structure of the tape insertion apparatus of FIGURES 1 and 2.

There is further mounted on the shaft 10, as shown in FIGURE 2, a cam 40 having a variable cam surface. A roller 41, as shown in FIGURE 1, is carried by a lever 42 having one end thereof pivotally mounted at 43. The lever 42 is biased by a spring 42A, as shown in FIGURE 1, so that the roller 41 is held in contacting relation with the variable cam surface of the cam 40. At the other end of the lever 42 a clevis 44 is pivotally connected by means of a pin 44A, and as shown in FIGURES 1 and 2, there is further pivotally connected to the clevis 44 by a pin 45 one end of a link 46. The opposite end of the link 46, as shown in FIGURE 3, is pivotally connected by a pin 46A to one end of a lever 47 which is in turn pivotally mounted at a point intermediate its opposite ends on a pin 48 projecting from a movable plate 57. The plate 57 is pivotally mounted at 58 on the bridge member 3, as shown in FIGURES 3 and 4.

Further, there is pivotally mounted at the opposite end of the lever 47 by a pin 47A a pawl 49 held in operative engagement with a tooth 50A of a ratchet 50 by a leaf-spring 51. The arrangement is such that upon rotation of the cam 40 by the shaft 10, the variable cam surface of the cam 40 causes through the described operating linkage and levers a movement to be imparted to the pawl 49 which in turn causes movement of the ratchet 50 thirty-six degrees (36°) in a counter clockwise direction, as viewed in FIGURE 3, for each revolution of the shaft 10.

The foregoing operation of the cam 40 is shown graphically on FIGURE 8 by the line D, in which as the cam shaft 10 is rotated from the one hundred degree (100°) position to a one hundred and sixty degree (160°) position, the pawl 49 moves the ratchet 50 thirty-six degrees (36°) in the counter clockwise direction, and thereafter, as the cam shaft 10 moves from the one hundred and sixty degree (160°) position to a one hundred and eighty degree (180°) position, the pawl 49 is moved by the action of the cam 40 to a return reset position, as indicated graphically by the line E on FIGURE 8, in which the pawl 49 operatively engages the next succeeding tooth 50A of the ratchet 50 for the succeeding operation thereof, as hereinafter explained.

The ratchet 50 has ten teeth 50A arranged for cooperative relation with the pawl 49 so as to effect the operation described for a purpose which will appear hereinafter. A spring detent lever 52 has a roller 52A arranged to cooperate with a detent plate 53 having formed therein 10 detent grooves 53A corresponding to the ten teeth 50A of the ratchet 50 and so arranged in relation to the roller 52A of the detent lever 52 as to detent or hold the ratchet 50 in each adjusted position imparted thereto by the pawl 49 so as to selectively align the nine slots of the unit 4 to be insulated with suitable slots in a plug 54 mounted in the ratchet 50.

The plug 54 includes ten slots, one of the slots 54A being open while the remaining nine slots 54B on initial operation contain tape forming pins 55 to be later described. Should the stator or rotor unit 4 contain a greater or lesser number of slots to be insulated than the nine slots specified, then, of course, the grooves 53A of the detent plate 53 and the teeth 50A of the ratchet 50 as well as the slots 54B contained therein for holding the tape forming pins 55 will be of a corresponding greater or lesser number.

The ratchet 50 and detent plate 53 are formed integral and in the example herein presented include the plug 54 with the open slot 54A and the nine slots 54B each arranged thirty-six degrees (36°) apart and similar in shape to the slots of the stator or rotor unit 4 to be insulated and in which the nine forming pins 55 initially carried by the slots 54B, shown in FIGURES 3 and 5, are to be placed. These forming pins 55 are tapered at the lower end so as to enter more easily the loop of the insulation tape formed in the slot 9B of the unit 4 to be insulated.

The ratchet 50 and detent plate 53 rotate in a bearing 56 mounted on the movable plate 57, as shown in FIGURES 1 and 3. The movable plate 57 is pivoted at 58 and may be pivoted away from the position shown in FIGURE 1 by the operator in order to load and unload the nest 5 with respect to the unit to be insulated. The movable plate 57 may be held in the position shown in FIGURE 4 by means of a spring-loaded pin 59 engageable in a hole 60 in the support or bridge member 3, as shown in FIGURE 4.

*Indexing operation*

There is further mounted on the shaft 10, a cam 61 having a variable cam surface and in contacting relation therewith there is provided a roller 62 carried by a lever 63 which has one end pivotally mounted at 22. The lever 63 is biased by suitable spring means not shown so as to maintain the roller 62 in contacting relation with the variable cam surface of the cam 61. At the other end of the lever 63, a link 64 is pivotally connected by a pin 64A. The link 64 is in turn pivotally connected to a clevis 65 by a pin 66. A pawl 67 is pivotally connected to the clevis 65 by a pin 68 and is held in operating engagement with a ratchet 8 by means of a leaf-spring 69. The ratchet 8, in the example given for a nine slot unit 4, has a corresponding number of nine teeth 8A and is detented or held in position by means of a spring-loaded detent 70 engaging nine corresponding holes 71 in ratchet 8, as shown in FIGURES 2 and 4. It will be seen then that rotation of cam 61 will move pawl 67 so as to rotate ratchet 8 forty degrees (40°) in a clockwise direction as viewed in FIGURE 2 for each rotation of shaft 10.

The foregoing operation of the cam 61 is shown graphically on FIGURE 8 by the line F, in which as the cam shaft 10 is rotated from a two hundred and eighty degree (280°) position to a three hundred and forty degree (340°) position, the pawl 67 is moved toward the left, as viewed in FIGURE 2, by the action of the cam 61 so as to rotate the ratchet 8 forty degrees (40°) in an indexing clockwise direction while upon further rotation of the cam shaft 10 from the three hundred and forty degree (340°) position to the three hundred and sixty degree (360°) position, as indicated by the line G on the graph of FIGURE 8, the pawl 67 is returned toward the right in a reset operation to engage the next succeeding tooth 8A of the ratchet 8 for the succeeding operation thereof, as hereinafter explained.

In the example herein given for a unit having nine slots to be insulated, the ratchet 8 has a corresponding number of teeth 8A and detent holes 71 forty degrees (40°) apart and corresponding to the number of slots to be insulated in the unit 4. Of course, where the unit 4 to be insulated has a greater or lesser number of slots, the teeth 8A of the ratchet 8 and detent holes 71 will correspond in number thereto and the degree of rotation of the ratchet 8 here given as 40° for each complete rotation of the shaft 10 will vary in accordance therewith. In the instant case, as applied to a nine slot unit, the rotation imparted to the ratchet 8 is forty degrees (40°) for each complete rotation of the shaft 10.

The cam shaft 10, as shown in FIGURE 2, may be driven manually through gears 72 and 73 by a crank shaft 74. It is understood that such mechanism may be driven from a gear reduction motor or by other suitable power means.

*Insulation tape*

In preparing the aforenoted described mechanism for operation, an insulation tape 75 which may be a thin "Mylar" tape (.001"-.002" in thickness) is formed in a roll of a predetermined length sufficient to provide a continuous strip of insulation in all of the slots of the stator or the rotor unit 4 to be insulated. The roll of insulating tape 75 is coiled about a spindle 76 which is in turn placed by the operator within the bore of the unit 4 and on a pin 77 projecting therein. The pin 77 projects into the bore of the unit 4 from a bracket 78 affixed to the bridge member 3 and the spindle 76 is arranged so as to be free to rotate on the pin 77.

The roll of the insulation tape 75 has a free end thereof looped around the forming blade 9 by the operator so that upon a lateral movement of the forming blade 9, as heretofore described, through the slot opening 9A the thin insulation tape 75 will be pushed or pressed by the blade 9 into the first slot 9B of the unit 4 to be insulated and thereafter the rotating movement imparted to the forming blade 9 within the slot 9B will serve to preform a small loop in the insulation tape 75 in the first slot 9B of the unit 4.

Thereafter, the unit 4, as shown in FIGURE 5, will have rotary movement imparted thereto by the ratchet 8 in a clockwise direction so that the next succeeding slot 9B will be similarly subject to the insertion of the insulating tape 75 by the forming blade 9 until after succeeding steps of the loop forming operations of the blade 9, there will be formed a continuous strip of the insulation tape within all of the slots of the unit 4 of the stator or rotor unit 4 to be insulated. Moreover, after each loop forming operation one of the forming pins 55 will be inserted into the corresponding slot 9B and loop of insulation tape 75 formed therein. After completion of the loop forming operations and all of the forming pins 55 have been inserted in the loops in the several slots of the unit 4, the operator will remove the unit 4 with the forming pins in position and subject the same to a heat treatment such that the insulation tape 75 will take a set corresponding to the configuration of the several slots of the unit 4, as hereinafter described in greater detail.

*Operation*

The unit 4 is first inserted in nest 5 and indexed by the operator to the correct position in an indexing fixture similar to fixtures used to index such units for machine winding as described in the aforenoted U.S. application Serial No. 746,437, filed July 3, 1958 (Patent No. 3,061,211), and U.S. application Serial No. 37,142, filed June 20, 1960 (Patent No. 3,061,212), both by the inventor of the subject matter herein, George I. Roberts.

In order to load the nest 5 in the annular receiving flange 8B mounted on the ratchet 8, the movable plate 57 is positioned by the operator about pivot 58 and away from ratchet 8 so that the annular receiving flange 8B is readily accessible to the operator. The plate 17 which is spring loaded is then lifted by the operator and positioned about pivot 18 away from the ratchet 8.

The stator nest 5 with the unit 4 positioned therein is then placed by the operator in the annular receiving flange 8B and on the pin 7 so as to locate the same in a predetermined precise relation relative to the ratchet 8. A predetermined length of "Mylar" tape or any other tape 75 having high dielectric strength and good insulating qualities is then coiled by the operator about spindle 76 and then the spindle 76 with the tape 75 coiled thereon is set over pin 77.

The tape 75 is of a predetermined length sufficient to effect a continuous insulation tape about the contour of the several slots 9B of the unit 4, while the free end of the tape 75 is looped about the forming blade 9, as shown in FIGURE 6, of a sufficient length as to reach the ninth opening or last slot to be insulated after the forming of the loop of insulation tape in the first slot.

Thereafter, the movable plate 17 is adjusted by the operator about pivot 18 to the position shown in FIGURE 1 while the movable plate 57 is angularly positioned by the operator about pivot 58 to the position shown in FIGURES 1, 3, and 4 together with the nine tapered forming pins slidably positioned in the slots 54B, as heretofore described.

Rotation of the crank handle 79 by the operator will then rotate the shaft 10 so as to first impart, as shown graphically on FIGURE 8 by the line A, a lateral motion to the knife blade 9 through the slot opening 9A into slot 9B of FIGURES 1 and 6, while at the same time pushing or pressing the tape 75 into the first slot 9B. After the forming blade has entered the slot 9B, it is oscillated through an angle of one hundred and eighty degrees (180°) to preform a small loop in the tape 75.

Oscillation of the forming blade 9, as shown graphically in FIGURE 8 by lines B and C, is accomplished by means of motion imparted by cam 25, to roller 26, lever 27, link 28, lever 30, actuating member 33, gear rack 35, and gear 36 attached to stud 37 which in turn rotates in bearing 38 to effect the oscillation of the blade 9 in bearings 15 and 16. A key portion 39 of the forming blade 9 slidably engages in a slot in the stud 37 so that the forming blade 9 may be effectively oscillated by stud 37. The forming blade 9 may also be laterally movable relative to the stud 37 at the key portion 39 upon a reciprocatory movement of the U-shaped member 14 which carries the forming blade 9 in the bearings 15 and 16.

After the blade 9 has been thus oscillated so as to preform the loop in the tape 75 within the slot 9B, it is then moved laterally through the slot opening 9A into the bore of the unit 4 so that the forming blade 9 is returned to the original position by the operation of the reciprocating member 14, lever 21, cam follower roller 20, and cam 19 as previously described.

As the forming blade 9 is moved out of the first slot 9B, cam 40 causes pawl 49, which is in engagement with ratchet 50, to angularly position the ratchet 50, plug 54, and detent plate 53 thirty-six degrees (36°) in a counter clockwise direction, as viewed in FIGURE 3 and shown graphically on FIGURE 8 by line D, so that the open slot 54A moves out of alignment with the first slot 9B of the unit 4 and the first slot 54B containing the tape forming pin 55 is angularly positioned into alignment with first slot 9B of the unit 4, as shown in FIGURE 5. Cam 40 in contact with the cam follower roller 41 will effect such operation through lever 42, linkage 46, and lever 47 so as to impart motion to pawl 49 to rotate the ratchet 50 in a predetermined timed relation with the operation of the mechanism effected by cams 19 and 25, as shown graphically on FIGURE 8 by the lines A, B, C, D, and E.

In the last-mentioned adjusted position the first tape forming pin 55 is free to drop since hole 80 in plate 57 and hole 81 in plate 17 are then in alignment. The pin 55 then drops through these clearance holes and the tapered portion enters the preformed loop of the tape 75. This pin 55 is then pressed far enough through the slot 9B to form the tape 75 to the configuration of the slot 9B.

The pin or pins 55 may be manually pressed or driven by the operator fully into the slot or slots 9B after the pin or pins 55 have dropped into position in the holes 80 and 81 or the latter operation may be effected by means of a plunger 82 operated by a solenoid 83, as shown in FIGURE 5, which may be assembled to the movable plate 57.

Energization of the solenoid 83 may be suitably controlled by an operator-operative switch 85 or the switch 85 and thereby the solenoid 83 and plunger 82 may be automatically controlled by a cam 86, as shown by FIGURE 7, mounted on the cam shaft 10 and effectively positioned to close and open a solenoid operating switch 85, as shown by line H on the graph of FIGURE 8.

Thus, after the pin 55 has dropped into position in the holes 80 and 81 and as the cam shaft 10 moves from the one hundred and sixty degree (160°) position to the one hundred and seventy degree (170°) position, the cam 86 will effectively close the switch 85 and maintain the same closed until the cam shaft 10 has been rotated to approximately the two hundred and fifty degree (250°) position at which time the cam 86 will be rotated by the cam shaft 10 to a position to open the switch 85.

In the latter operation, it will be seen that, as shown graphically on FIGURE 8 by the line I, so long as a solenoid 83 is effectively energized by the closing of the switch 85, pressure will be applied to the pin 55 by the solenoid plunger 82 to force the pin 55 into the slot 9B and loop of insulation tape 75 therein. Thus, as the cam shaft 10 rotates from the one hundred and seventy degree (170°) position to the two hundred and fifty degree (250°) position, pressure will be applied by the solenoid plunger 82 to the pin 55 in the slot 9B of the unit 4. However, as the cam shaft 10 continues to rotate from the two hundred and fifty degree (250°) position to the two hundred and seventy degree (270°) position, causing the cam 86 to open the switch 85, the solenoid plunger 82 will be reset and the pressure applied thereby to the pin 55 will be withdrawn, as indicated graphically on FIGURE 8 by the line J.

The solenoid plunger 82 is withdrawn by a biasing spring 87 when the solenoid 83 is de-energized whereupon the looped tape 75 is then firmly held in position in the first slot 9B by the tape forming pin 55. The nest 5 with the unit 4 secured therein by fastening screw 6 is now rotated forty degrees (40°) in a clockwise direction, as viewed in FIGURE 2, by the action of the cam 61 in cooperation with pawl 67, as shown graphically in FIGURE 8 by the line F, upon the rotation of cam shaft 10 from the two hundred and eighty degree (280°) position to the three hundred and forty degree (340°) position. Thereafter, upon rotation of the cam shaft 10 to the three hundred and sixty degree (360°) position the cam 61 resets the pawl 67, as shown graphically on FIGURE 8 by the the line G.

The second stator slot 9B of the unit 4 in the last-mentioned adjusted position thereof is now in a position to receive tape 75 upon the succeeding operation of the forming blade 9. Indexing of the stator nest 5 is accomplished by rotation of cam 61 through cam roller 62, lever 63, linkages 64 and 65 to move pawl 67 which rotates the nest 5 forty degrees (40°) in said clockwise direction and in a predetermined timed relation with the operation of the mechanism effected by the cams 19, 25, and 40, as shown graphically on FIGURE 8 and heretofore explained in detail.

The operation is then repeated and the forming blade 9 is moved laterally through the stator slot opening 9A into the second slot 9B, pushing or pressing the tape 75 into this slot by the cam means previously described. The operations of the forming blade 9, the tape forming pin turret composed of ratchet 50 integral with detent plate 53, plug 54, the tape forming pins 55, and the index nest 5 are repeated nine times so as to place the insulation tape 75 with tape forming pins 55 in the several slots of the unit 4.

After this operation, the plate 57 with associated parts is angularly positioned by the operator about pivot 58 away from the stator nest 5. The plate 17 is then lifted by the operator and positioned about pivot 18 away from the stator nest 5 so that the unit 4 may be readily accessible to the operator.

The nest 5 with the unit 4 and nine tape forming pins 55 therein may now be removed from the mechanism by the operator. The first tape forming pin 55 is then removed by the operator and a free end of the predetermined length of tape 75 positioned in the first slot 9B of the unit 4. This free end of the tape 75 is then lapped in the first slot 9B and the first forming pin 55 is then reinserted in the slot 9B.

The unit 4 with the pins 55 therein is then removed from nest 5 after loosening screw 6. The unit 4 with the nine tape forming pins 55 is then submitted to a temperature of one hundred and eighty degrees Fahrenheit (180° F.) for approximately fifteen (15) minutes so that the insulation tape 75 under such heat treatment is set to the configuration of the slots 9B after the pins 55 have been removed. After removing the pins 55, the unit 4 is ready for winding of coils in the slots, as described in the aforenoted U.S. application Serial No. 746,437 and U.S. application Serial No. 37,142.

The tape forming pins 55 may be manufactured as a molding or a precision casting and should have as long a taper as practical with a smooth finish in order to easily enlarge the preformed loop in the insulation tape 75 started by the forming blade 9.

After winding a complete unit 4 insulated in this manner, the windings are held in the slots by means of wedges or a wedge plug similar to that described in abandoned U.S. application Serial No. 671,556, filed July 12, 1957, by George I. Roberts, the inventor of the subject matter herein. If a wedge plug is used it must be removed after impregnation or potting to remove the excess tape in the bore of the unit 4. This excess tape may then be removed by grinding or burning.

Although several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A method of electrically insulating an electrical device having a bore and slots opening therefrom, comprising the steps of positioning a forming blade in the bore of the device, placing a roll of electrical insulating tape in the bore of the device with an end portion of the tape positioned between the blade and the opening from the bore into one of the slots; moving the blade through the opening into said one slot and thereby pressing a portion of said tape into said one slot by said blade, then rotating the blade so as to form the portion of the insulating tape in said one slot into a substantially circular loop, and moving the blade from said one slot through the opening thereof into the bore of the device; thereafter moving the blade from the bore through the opening into a succeeding slot of the device and thereby pressing another portion of said tape into said succeeding slot by said blade, then rotating the blade to form the portion of the insulating tape in said succeeding slot into another substantially circular loop, and moving the blade from said succeeding slot through the opening thereof into the bore of the device; and thereafter pressing other portions of the insulating tape into each of the succeeding slots of the device by repeating the three last-mentioned steps until a continuous strip of the insulating tape has been inserted in all of the slots opening from the bore of the device and formed into a plurality of substantially circular loops.

2. The method defined by claim 1 including the step of inserting forming pins into each of the substantially circular loops of insulating tape formed in said slots, thereafter subjecting the device, insulating tape and forming pins to a temperature sufficiently high as to cause the strip of insulating tape to conform to a contour effected by the slots and forming pins, and thereafter removing the forming pins from the loops of the insulating tape in said slots.

3. An apparatus for inserting a continuous strip of electrical insulating tape into a device having a bore and slots opening from the bore of the device; said apparatus comprising means for supporting a strip of electrical insulating tape in the bore of the device, blade means, means for mounting the blade means in the bore of the device, second means for effecting lateral movement of the blade means selectively through the openings from the bore into each of the slots so as to force portions of the strip of insulating tape into each of the slots and third means for effecting rotary movement of said blade means in each of said slots so as to form substantially circular loops in the portions of the strip of tape in each of the aforesaid slots.

4. The combination defined by claim 3 including a plurality of forming pins, and means for selectively inserting said forming pins into each of the substantially circular loops of the portions of the strip of tape formed in the slots of the aforesaid device.

5. The combination defined by claim 4 including timing means for operating the lateral and rotary blade movement effecting means and the means for selectively inserting said forming pins in a predetermined cycle of operation.

6. An apparatus for inserting a continuous strip of electrical insulating tape into a device having a bore and slots opening from the bore of the device; said apparatus comprising means for mounting a roll of electrical insulating tape in the bore of the device, blade means, means for mounting the blade means in the bore of the device, first operating means for effecting lateral movement of the blade means selectively through the opening from the bore into one of the slots so as to force a portion of the roll of insulating tape into said one slot, second operating means for selectively effecting rotary movement of said blade means in said one slot so as to form a substantially circular loop in the portion of the tape in said one slot, means for carrying a plurality of forming pins, and third operating means for selectively inserting one of said forming pins into the substantially circular loop of the tape portion formed in said one slot of the aforesaid device.

7. An apparatus for inserting a continuous strip of electrical insulating tape into a device having a bore and slots opening from the bore of the device; said apparatus comprising means for mounting a roll of electrical insulating tape in the bore of the device, blade means, means for mounting the blade means in the bore of the device, first operating means for effecting lateral movement of the blade means selectively through the opening from the bore into one of the slots so as to force a portion of the roll insulating tape into said one slot, second operating means for selectively effecting rotary movement of said blade means in said one slot so as to form a substantially circular loop in the portion of the tape in said one slot, means for carrying a plurality of forming pins, third operating means for selectively inserting one of said forming pins into the substantially circular loop of the tape portion formed in said one slot of the aforesaid device, and timing means for selectively actuating said first, second and third operating means in a predetermined sequence of operation.

8. An apparatus for inserting a continuous strip of electrical insulating tape into a device having a bore and slots opening from the bore of the device; said apparatus comprising means for mounting a roll of electrical insulating tape in the bore of the device, blade means, means for mounting the blade means in the bore of the device, first operating means for effecting lateral movement of the blade means selectively through the opening from the bore into one of the slots so as to force a portion of the roll of insulating tape into said one slot, second operating means for selectively effecting rotary movement of said blade means in said one slot so as to form a substantially circular loop in the portion of tape in said one slot, means for carrying a plurality of forming pins, third operating means for selectively inserting one of said forming pins into the substantially circular loop of the tape portion formed in said one slot of the aforesaid device, timing means for selectively actuating said first, second and third operating means in a predetermined cycle of operation, and said timing means including fourth operating means for actuating said device upon completion of the cycle of operation so as to successively index said device for succeeding cycles of operation of the first, second and third operating means in effectively providing substantially circular looped portions of the strip of insulating tape in each of the slots of the device together with one of said forming pins in each of the looped portions formed in the slots of said device.

9. An apparatus for insertion of insulation tape in slots of a slotted unit of an inductive device in which coils are to be wound, said apparatus comprising a rotatable cam shaft, an insertion mechanism supported for movement adjacent said cam shaft, a cam rotatable with said cam shaft, said cam having a variable surface, said insertion mechanism further comprising a roller arranged in cooperative relation with said variable cam surface, a lever pivotal at one end mounting said roller and operable by said roller to oscillate upon rotation of said cam, a reciprocating member connected to said lever at the other end of said lever for movement therewith, a blade connected to said reciprocating member and extending adjacent the slots of the slotted unit of the inductive device and carried by said reciprocating member for lateral movement of said blade in and out of the slot in timed relation set by the variable surface of said cam and rotation of said cam shaft, and said apparatus adapted to receive strip of electrical insulating tape between said blade and said slots and operable to be moved by said blade within each of said slots and a rotary mechanism for rotating said blade within said slot to form said insulating tape into a loop within said slot.

10. The combination defined by claim 9 including a forming pin, means for inserting said forming pin in said loop of insulating tape within said slot so as to conform said loop of insulating tape to substantially the shape of said slot, and means operative by said cam shaft for controlling said pin inserting means.

11. An apparatus for insertion of insulation tape in substantially circular slots of a slotted unit of an electrical device in which coils are to be wound, said apparatus comprising an insertion means supported adjacent the slots of the slotted unit, said apparatus adapted to receive a strip of electrical insulating tape between said insertion means and the slots of the slotted unit, means for effecting lateral movement of said insertion means selectively within each slot of the slotted unit to force a portion of the insulating tape into each slot, a rotary mechanism operable in timed relation with said insertion means, said rotary mechanism further comprising a cam rotatable in timed relation with the movements of said insertion means, said cam having a variable surface, a roller arranged in cooperative relation with said variable cam surface, a pivotal lever supporting said roller, said roller held in operative engagement with said variable cam surface to oscillate said lever and to retain said insertion means within each of said slots for a predetermined time, depending on the variable surface of said cam and rotation of said cam shaft, a slidable member connected for reciprocation with said lever, a gear rack integral to said slidable member, and a gear means engaging said rack for rotation, said gear means having a slot extending in the direction of the reciprocating movement of said slidable member, said insertion means keyed within the slot of the gear means for the lateral movement of the insertion means within each slot to force the portion of the insulation tape into each of the slots, and for the rotation of the insertion means while located in each slot to force the inserted portion of the insulation tape into a substantially circular loop within said slot.

12. An apparatus for insulating the slots of a slotted unit of an electrical device so as to prepare the unit for the winding of field coils in the slots of such units comprising a cam shaft, an insertion mechanism supported for movement adjacent said cam shaft, an insertion mechanism cam having a variable surface, rotatable with said shaft, said insertion mechanism further comprising a roller arranged in cooperative relation with said variable surface of said cam, a pivotal lever mounting said roller and operable by said roller to oscillate upon rotation of said insertion mechanism cam by said cam shaft, a reciprocating member connected to said lever for movement therewith, a blade connected to said reciprocating member extending adjacent the slotted unit of the electrical device, said blade carried by said reciprocating member for lateral movement of said blade in and out of the slot in timed relation set by the variable cam surface and rotation of said cam shaft, said apparatus adapted to receive a strip of electrical insulating tape between said blade and said slots, operable to be moved by said blade within each slot and said blade to remain within said slot for a predetermined time provided by the variable surface of said insertion mechanism cam, a rotary mechanism operable in timed relation with said insertion mechanism, said rotary mechanism further comprising a rotary mechanism cam rotatable in timed relation with the movements of said insertion mechanism cam, a roller arranged in cooperative relation with said rotary mechanism cam, a pivotal lever supporting said roller and operable therewith to oscillate upon rotation of said rotary mechanism cam, a slidable member connected for reciprocation with said lever, a gear rack integral to said slidable member, a gear means having a slot extending in the direction of the reciprocating movement of said insertion mechanism, said blade slidably keyed therein, whereby said blade is laterally movable within the slot by said insertion mechanism and then rotated by said rotary mechanism through said slotted gear means for inserting said insulating tape within a slot of said slotted unit and then rotating said blade to form said insulating tape into a substantially circular loop within said slot.

13. An apparatus for inserting insulating material within the slots of a slotted unit of an inductive device comprising a cam shaft, an insertion mechanism supported for movement adjacent said cam shaft, said insertion mechanism further comprising a blade means, said apparatus adapted to receive a strip of insulating tape between said blade means and the slots of said slotted unit, an insertion mechanism cam supported for rotation by said cam shaft, operating means for mounting the blade means for reciprocating movement by said insertion mechanism cam to press said tape within the slot and operable to retain said blade means with said tape within said slot for a predetermined time, a rotary mechanism for effecting rotary movement of said blade means while within said slot for said predetermined time to form said tape into a substantially circular loop in said slot, said rotary mechanism further comprising a rotary mechanism cam supported for rotation by said cam shaft, and an operating means operable by said rotary mechanism cam to effect said rotary movement, a pin inserting mechanism having a portion operable above said slotted unit, said pin inserting mechanism further comprising a pin inserting mechanism cam mounted for rotation by said cam shaft and operable in timed relation with said insertion mechanism cam and said rotary mechanism cam, a roller adapted to be actuated by said pin inserting mechanism cam, a lever carrying said roller, said lever having one end thereof pivotally mounted adjacent said roller and operable by said roller to oscillate upon rotation of said pin inserting mechanism cam, a pawl connecting the other end of said lever and operable by said lever to move laterally therewith, a circular ratchet supporting a plurality of pins engaging said pawl and rotatable by said pawl for a predetermined angular rotation, said pawl and said circular ratchet being the portions operable above said slotted unit, whereby said pins are supported by said ratchet for selectively inserting one pin in each of the formed circular tape loops upon every predetermined angular rotation of said ratchet by said pawl.

14. The structure of claim 13 further comprising a pin indexing mechanism including an indexing cam supported by said cam shaft and operable in timed relation with said insertion mechanism cam, said rotary mechanism cam and said inserting mechanism cam, a roller arranged in cooperative relation with said indexing cam, a lever carrying said roller and operable by said roller to oscillate upon rotation of said indexing cam, a pawl held in operative engagement with said lever, a ratchet operable by said pawl to rotate a predetermined angle to present a slot with the substantially circular tape loop formed therein below a pin from the pin inserting mechanism which is selectively aligned above the slots of said slotted unit, and an actuating means operable to insert the pin within said formed loops.

15. The structure of claim 14 further comprising an actuating cam operable in timed relation with said insertion mechanism cam, said rotary mechanism cam, said pin inserting mechanism cam and said indexing mechanism cam, a switch adapted to be sequentially closed by said actuating cam, and a solenoid means energized by said switch to inject each of said pins into each of said formed loops.

16. The structure of claim 15 further comprising means for removing the portion of the pin inserting mechanism from above said slotted unit after the completion of the pin inserting operation and means for removing said slotted unit with the pins within each of the slots of the slotted unit holding the formed loop within these slots to thereby provide a device independent of the inserting apparatus, whereby said device can be heated and said tape retain permanent circular configuration when said pins are removed.

References Cited by the Examiner
UNITED STATES PATENTS

| | | | |
|---|---|---|---|
| 1,661,355 | 3/1928 | Baker | 29—205 |
| 2,234,017 | 3/1941 | Bauer | 156—212 XR |
| 2,340,291 | 2/1944 | Wirtz | 29—205 |
| 3,150,280 | 9/1964 | Little | 310—215 |

WHITMORE A. WILTZ, *Primary Examiner.*

J. F. CAMPBELL, *Examiner.*

J. W. BOCK, *Assistant Examiner.*